US012732347B2

(12) United States Patent
Heinlein

(10) Patent No.: US 12,732,347 B2
(45) Date of Patent: Sep. 8, 2026

(54) END TO END ENCRYPTION WITH ROAMING CAPABILITIES

(71) Applicant: OFFICE IRC INC., Ottawa (CA)

(72) Inventor: Paul Heinlein, Cantley (CA)

(73) Assignee: Encstocom LLC, Grand Cayman (KY)

( * ) Notice: Subject to any disclaimer, the term of this patent is extended or adjusted under 35 U.S.C. 154(b) by 0 days.

(21) Appl. No.: 18/880,027

(22) PCT Filed: Apr. 27, 2023

(86) PCT No.: PCT/CA2023/050570
§ 371 (c)(1),
(2) Date: Dec. 30, 2024

(87) PCT Pub. No.: WO2024/020666
PCT Pub. Date: Feb. 1, 2024

(65) Prior Publication Data

US 2025/0260557 A1 Aug. 14, 2025

Related U.S. Application Data

(60) Provisional application No. 63/392,155, filed on Jul. 26, 2022.

(51) Int. Cl.
*H04L 9/08* (2006.01)
*H04L 9/32* (2006.01)

(52) U.S. Cl.
CPC .......... *H04L 9/0825* (2013.01); *H04L 9/0863* (2013.01); *H04L 9/3226* (2013.01); *H04L 9/3236* (2013.01)

(58) Field of Classification Search
CPC ... H04L 9/0825; H04L 9/0863; H04L 9/3226; H04L 9/3236
See application file for complete search history.

(56) References Cited

U.S. PATENT DOCUMENTS

2004/0030932 A1 2/2004 Juels et al.
2018/0091487 A1* 3/2018 Lin .................... H04L 9/0894
(Continued)

FOREIGN PATENT DOCUMENTS

CN 109067524 12/2018
CN 112637131 4/2021

OTHER PUBLICATIONS

Sad Er: “1Password Security Design: Teams Families and Individual Accounts” White Paper, Release: Apr. 12, 2017, XP 55417891A 1, https://1password.com/files/1 password for Teams White Paper. pdf (Year: 2017).*

(Continued)

*Primary Examiner* — Henry Tsang
(74) *Attorney, Agent, or Firm* — Burr & Forman

(57) ABSTRACT

Systems and methods relating to end to end encryption. Encrypted data stored on a server or transmitted by way of a server can be accessed from any number of authenticated client devices by storing an encrypted private key on the server. The encrypted data can only be decrypted by the decrypted version of the encrypted private key. The encrypted private key is undecryptable by the server and can only be decrypted using user provided credentials (e.g. a user provided password/passphrase). For the user to access the encrypted data, the client device used by the user downloads the encrypted private key along with the encrypted data. The encrypted private key is then decrypted using user provided credentials and the decrypted private key is used to decrypt the downloaded encrypted data. The decrypted private key never leaves the client device and is never used by the server.

9 Claims, 4 Drawing Sheets

(56) References Cited

U.S. PATENT DOCUMENTS

| | | | | |
|---|---|---|---|---|
| 2019/0306151 | A1 | 10/2019 | Hamel et al. | |
| 2021/0409951 | A1* | 12/2021 | Klinkner | H04W 12/03 |
| 2022/0029802 | A1 | 1/2022 | Ebrahimi et al. | |
| 2022/0385643 | A1* | 12/2022 | Movva | H04L 9/0827 |

OTHER PUBLICATIONS

International Search Report and Written Opinion of the International Searching Authority (ISA/CA) for corresponding PCT App. No. PCT/CA2023/050570, mailed Jun. 23, 2023. 11 pages.

Tarush-R, et al., README.md for CYPHER, in mast3rmndx/E2EE-Chat, Jul. 12, 2021 (Dec. 7, 2021) https://github.com/mast3rmindx/E2EE-Chat.

Lewis, B., End ot end encryption with multiple users, Nov. 20, 2017 (Nov. 30, 2017). https//security.stackexchange.com/questions/174647/end-to-end-encryption-with-multiple-users.

Extended Search Report and Written Opinion from corresponding European Application No. 23844706.4, mailed Jul. 28, 2025, all pages cited in its entirety.

Sad Er: "1Password Security Design: Teams Families and Individual Accounts" White Paper, Release: Apr. 12, 2017, XP55417891A 1, https://1password.com/files/1 password for Teams White Paper.pdf.

* cited by examiner

END TO END ENCRYPTION WITH ROAMING CAPABILITIES

CROSS REFERENCE TO RELATED APPLICATIONS

This application is a national stage filing under 35 U.S.C. § 371 of PCT Application No. PCT/CA2023/050570 filed on Apr. 27, 2023, entitled "END TO END ENCRYPTION WITH ROAMING CAPABILITIES", which claims priority to U.S. Provisional Application No. 63/392,155 filed on Jul. 26, 2022, and entitled "END TO END ENCRYPTION WITH ROAMING CAPABILITIES", both of which are incorporated herein by reference in their entirety.

TECHNICAL FIELD

The present invention relates to cryptography and secure communications. More specifically, the present invention relates to systems and methods for providing end to end encryption for multiple clients while preventing servers from accessing stored encrypted communications.

BACKGROUND

The digital and communications revolution of the past two decades has highlighted not just the centrality of communications in the modern world but also the need for privacy. While we are now able to digitally converse with almost anyone in the world at our leisure, there is no guarantee that our communications are secure from eavesdropping. To this end, End-To-End Encryption was devised to allow users to securely communicate with one another digitally. Communications are encrypted and are only decrypted at a user's client device. Public key-private key pairs are used in such communications schemes, with a transmitting user encrypting communications at their client device using the public key. A receiving user then receives the encrypted communications and decrypts the encrypted communications using their private key at their client device.

However, while End-to-End Encryption (E2EE) is useful, current E2EE systems suffer from a significant drawback. The private keys used by End-To-End Encryption are typically generated and stored exclusively at only one client-side user end-point. No other end-points used by the same client have access to the private key, and therefore cannot decrypt any server-side stored or relayed data that was encrypted using the public key that is paired to it. This creates a problem for the user if they need to switch end-points (i.e. switching from mobile device to workstation, replacing a lost device, etc.) because they will lose the ability to read server-stored data and cause disruptions to on-going communications. If the E2EE private key could be stored server-side, this will allow it to be shared with new and existing end-points that belong to the client, but unless this can be done in a secure way it will defeat the whole purpose of using E2EE because the operator of the system could simply reset the account password to gain access to old and new client data. Even if the client encrypted the private key client-side with the account passphrase before storing the result server-side, it would still be vulnerable because the passphrase when being used over TLS during authentication could still be intercepted server-side.

Because of the above, there is therefore a need for systems and methods that allow for secure E2EE communications and which also allow users to securely switch client devices or end-point devices without losing access to their secure communications.

SUMMARY

The present invention provides systems and methods relating to end to end encryption. Encrypted data stored on a server or transmitted by way of a server can be accessed from any number of authenticated client devices by storing an encrypted private key on the server. The encrypted data can only be decrypted by the decrypted version of the encrypted private key. The encrypted private key is undecryptable by the server and can only be decrypted using user provided credentials (e.g. a user provided password/passphrase). For the user to access the encrypted data, the client device used by the user downloads the encrypted private key along with the encrypted data. The encrypted private key is then decrypted using user provided credentials and the decrypted private key is used to decrypt the downloaded encrypted data. The decrypted private key never leaves the client device and is never used by the server.

In a first aspect, the present invention provides a method for accessing encrypted data using a client device, said encrypted data being transmitted from a server to said client device, the method comprising:

- undergoing a login and authentication process to thereby authenticate a user and said client device to said server, said login and authentication process involving a user first password;
- receiving an encrypted private key from said server at said device;
- decrypting said encrypted private key at said client device using a private key decryption key, said private key decryption key being derived from a user second password and from at least one user identification element;
- receiving said encrypted data from said server;
- decrypting said encrypted data using said decrypted private key;

wherein

- said user first password and said user second password are only available to said user;
- said encrypted private key is undecryptable by said server;
- said encrypted private key can only be decrypted using said private key decryption key;
- said decrypted private key is only ever used by said client.

In a second aspect, the present invention provides a method for accessing encrypted data by way of a server, said encrypted data being transmitted from said server to a client device, the method comprising:

- authenticating a user and said client device to said server;
- at said client device, receiving an encrypted private key from said server, said encrypted private key being previously stored on said server by said user;
- decrypting said encrypted private key at said client device using a private key decryption key to result in a decrypted private key, said private key decryption key being derived from user supplied credentials;
- receiving said encrypted data from said server;
- decrypting said encrypted data using said decrypted private key;

wherein

- said encrypted private key is undecryptable by said server;
- said encrypted private key can only be decrypted using said private key decryption key;

said decrypted private key is only ever used by said client.

In a further aspect, the present invention provides computer readable media having encoded thereon computer readable and computer executable code that, when executed, implements a method for accessing encrypted data by way of a server, said encrypted data being transmitted from said server to a client device, the method comprising:

authenticating a user and said client device to said server;

at said client device, receiving an encrypted private key from said server, said encrypted private key being previously stored on said server by said user;

decrypting said encrypted private key at said client device using a private key decryption key to result in a decrypted private key, said private key decryption key being derived from user supplied credentials;

receiving said encrypted data from said server;

decrypting said encrypted data using said decrypted private key;

wherein said encrypted private key is undecryptable by said server;

said encrypted private key can only be decrypted using said private key decryption key;

said decrypted private key is only ever used by said client.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
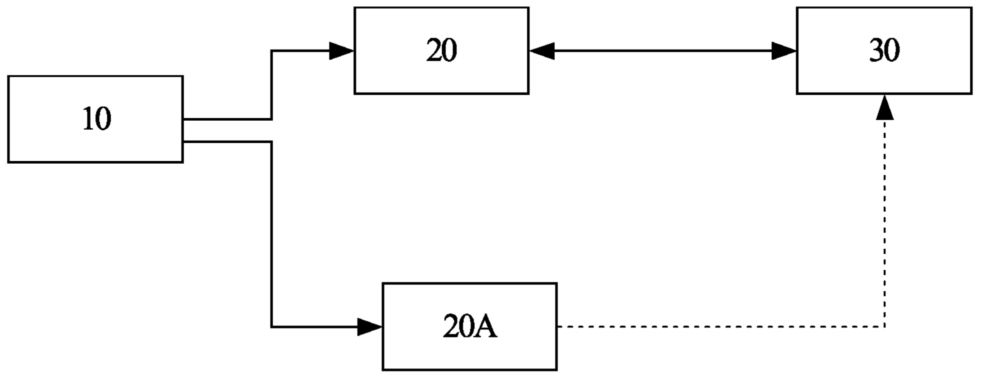
FIG. 1 is a is a block diagram of an environment on which the present invention can be practiced.

Referring to FIG. 1, a block diagram of an environment in which the present invention may be practiced is presented. In this scenario, a user 10 is using a client device 20 that communicates with a server 30. The user and the client device have already been logged in and authenticated and the user has uploaded encrypted data 40 to the server 30 and wishes to access this stored data using E2EE. As noted above, while this is possible using client device 20, trying to do this from another client device 20A may be difficult using current technology.

Figure 2:
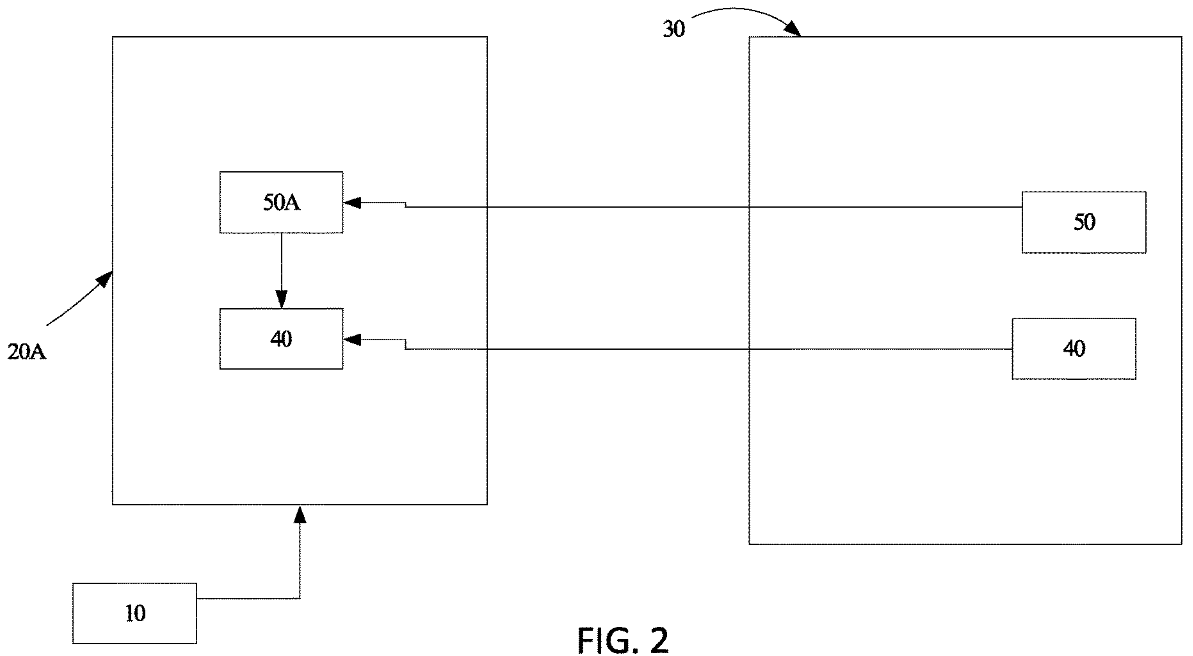
FIG. 2 illustrates a block diagram illustrating the components used in one implementation of the present invention.

Referring to FIG. 2, one aspect of the present invention is illustrated. In the present invention, the user 10 can access the encrypted data 40 from client device 20A by having client device 20A authenticated and logged in to server 30. The user 10 then downloads an encrypted private key 50 that has been previously stored on server 30. The encrypted data 40 can only be decrypted by a decrypted version of the encrypted private key 50 and the encrypted private key 50 can only be decrypted by the client device 20A using a unique password/decryption passphrase from the user. The user thus downloads encrypted private key 50 to client device 20A, decrypts the encrypted private key on client device 20A, and then downloads the encrypted data 40. The encrypted data 40 can then be decrypted using the decrypted private key 50A. It should be noted that the server 30 does not have the ability to decrypt or cannot decrypt the encrypted data 40 or the encrypted private key 50. As well, the decrypted version of the private key 50A never leaves either client device 20A or client device 20. This ensures that the server 30 cannot access the encrypted data 40.

The above aspect of the present invention allows a user to use E2EE on multiple client devices while ensuring that the server (or any other potential eavesdropper) is unable to access the stored encrypted data.

Figure 3:
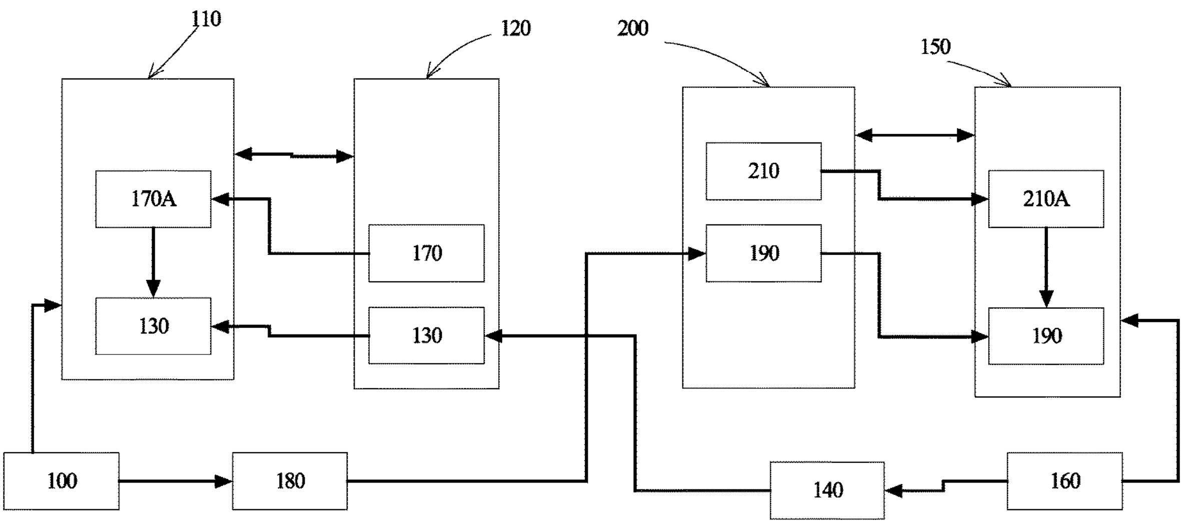
FIG. 3 is a block diagram illustrating a communications system that implements one aspect of the present invention.

The various aspects of the present invention can also be used to ensure E2EE when communicating between different users across a communications medium with intervening servers. Referring to FIG. 3, this aspect of the present invention is illustrated in the block diagram. For this scenario, a first user 100 operates a first client device 110 to access a first server 120. Stored in the first server 120 is first encrypted data 130 encrypted using first user's public key 140 by way of second client device 150 operated by second user 160. Assuming the first user 100 has been authenticated and logged in to first server 120, first user can download first encrypted data 130 to first client device 110 as well as first encrypted private key 170. The user then decrypts first encrypted private key 170 to result in decrypted private key 170A on the first client device 110. This decrypted private key 170A corresponds to the first user's public key 140 and can thus be used to decrypt the downloaded first encrypted data 130. The first user 100 can thus decrypt the first encrypted data 130 using the decrypted private key 170A on the first client device 110. As the decrypted private key 170A never leaves the first client device 110 and as only the decrypted private key 170A is the only key that can decrypt the first encrypted data 130, the first server 120 has no access to the data in the first encrypted data 130. It should be clear that the first encrypted private key 170 is only decrypted with a password or decryption key that only the first user 100 can provide. This ensures that none of the other components in the communications system (and none of the other users of the communications system) can decrypt the first encrypted private key 170. Accordingly, none of the users or components of the system can access or decrypt the first encrypted data 130 without the first user's assistance.

On the other side of the communications system, the second user 160 also has a corresponding public key 180 that the first user 100 can use to encrypt data meant for the second user. This second encrypted data 190, encrypted using the public key 180, is transmitted and stored on the second server 200. The second user 160, also authenticated and logged in to second server 200 by way of the second client device 150, can access the second encrypted data 190 by downloading this second encrypted data 190 and a second encrypted private key 210. The second encrypted private key 210 can be downloaded on to the second client device 150 and be decrypted into the second decrypted private key 210A. This second decrypted private key 210A corresponds to the public key 180 and can be used to decrypt the second encrypted data 190. The second decrypted private key 210A cannot be decrypted without assistance or a password or passkey obtained from the second user 160. Accordingly, as with the first side of the communications system, none of the users of the system can access the data in the second encrypted data 190 without first decrypting the second encrypted private key 210. And, as this cannot be done without the assistance or input of the second user 160, the system is secure for communications going either from first user 100 to second user 160 or from second user 160 to first user 100. At this end of the system, the second server 200 cannot access the data in second encrypted data 190 nor can the second server 200 decrypt the second encrypted private key 210.

As can be imagined, communications from first user 100 to second user 160 is encrypted using the second user's public key and is decrypted using the decrypted second private key. Communications from the second user 160 to the first user 100 are encrypted using the first user's public key and are decrypted using the decrypted first private key. Since neither of the two servers is able to access either decrypted private keys, and since neither of the decrypted private keys ever leaves a client device, the system is secure. Preferably, the decrypted private keys are only ever used to decrypt the encrypted data and only on a client device.

For greater security, the key to decrypt encrypted private key can be derived from a user provided keyword along with user provided identification credentials. The greater security results from adding a form of salt to the hashing (as will be explained further below). After the hashing, the resulting password should be so unique that it will not be susceptible to dictionary attacks. As an example of the above, instead of just using a user provided keyword as the decryption key to decrypt the encrypted private key, the decryption key can be derived from a combination of parts of the user's identification credentials in addition to the keyword. Thus, a decryption key can be derived from a concatenation of parts of any combination of the user's email address, telephone number, username, and the keyword. The resulting concatenation can then be run through a non-reversible hashing process that produces the decryption key. Thus, for example, a user may have identification credentials as follows:

Username: AUser

Email address: AUser@emaildomain.com

Telephone number: 818-555-1212

Keyword: 12ab34cd56ef.

For such a user, an example concatenated string that can then be hashed to produce the decryption key may be:

AUs+AUser@email+818555+12ab34cd56ef where the + is the concatenation operator. Of course, any combination of any of the user's identification credentials can be used to create the value that is hashed to produce the decryption key. As well, while the example only used part of each of the identification credentials, any combination of such credentials may be used. As noted above, it is preferable if the result of a non-reversible hashing of the concatenated string/value is used as the decryption key.

In another example, using the user credentials given above, another suitable basis for a decryption key may be {user phone_number}+{keyword}+{app_passphrase_for_private_key}

For clarity, the "passphrase_for_private_key" is a hard-coded string (a passphrase) in the client software and would be the same for everyone using that specific implementation. Such passphrases would be generated by the company writing the software implementation (similar to a root certificate for a certificate authority). The same passphrases would be used by all client software using the same implementation. Depending on the implementation, there could be one passphrase for the decryption key and there could be a different passphrase for the login/authentication password. The passphrases act as a form of salt that makes the hashes more non-reversible against a dictionary attack as the dictionary will need to be implementation specific and therefore unfeasible. For some implementations, two passphrases are used to generate different results depending on use—one passphrase could be used to generate the private key decryption key while another different passphrase could be used to generate login/authentication password as explained below.

Using the credentials and the decryption key scheme given above, the decryption key would thus be:

818555121212ab34cd56ef+[passphrase]

and this resulting string/value can then be run through the one-way hashing process to result in the decryption key.

In another alternative, for ease of use for the user, the credentials provided by the user for a proper login are, preferably, just the user's password and another credential (e.g. a user's userID, email address, or phone number). The user's password and the other credential can then be combined to produce a string/value that can be hashed. The result of the one way hashing process can thus be the decryption key noted above. Of course, a passphrase may also be incorporated into this process as explained above.

As noted above, in addition to the above concatenated string value (with or without a passphrase), a one way hash function is preferably applied to the string value and the resulting hash value would be the decryption key used to decrypt the encrypted private key. It should be clear that encrypting the private key prior to storing the encrypted private key on the server would be necessary. In terms of the encryption key, this may not matter as long as the encrypted private key can be decrypted using the user supplied identification credentials and the user provided keyword. Thus, the encryption/decryption may be symmetric (using the same encryption/decryption key) or asymmetric (using an encryption key that is different from the decryption key) as long as the resulting encrypted private key can be decrypted with the user supplied credentials.

For added security, the login and authentication process that a user has to undergo to login and get authenticated by a server is, preferably, separate and independent from the process relating to downloading either the encrypted private key or the encrypted data from the server. The login and authentication process can involve a password that, again, is derived from user supplied credentials as well as a user supplied keyword. As with the decryption key noted above, the login and authentication password may be derived from the user credentials and user supplied keyword but, as may be imagined, is different from the decryption key noted above. The generation of the authentication password may, of course, involve the use of a passphrase as detailed above. As previously noted, the passphrase would be generated by the software developers involved in producing the application and may be different from the passphrase used to generate a decryption key.

As an example of the above, instead of the concatenated key detailed above, a login/authentication password may be produced from (using the user credentials above and prior to passing the result through a one way hashing process):

Use+emaildomain+555+12ab34cd56ef

As with the example above, the + is a concatenation operator. It can be seen that the basis for the decryption key (prior to the hashing process) is derived by using the first few characters of each user credential while the pre-hashing basis for the login/authentication password is derived by using the middle portions of each user credential. The only exception would be the user keyword as the whole keyword is used in both instances. As detailed above, the resulting string from the user credentials are passed through a non-reversible hashing process and the result from the hashing process would be used as the decryption key or as the login password. The process may, of course, also use a passphrase prior to the hashing process as explained above.

As noted above with the decryption key, instead of the actual generated string from the user credentials, the login/authentication password is the result of a one-way hash of the generated string from the credentials. This resulting password may be used to authenticate the user and the client device to the server. This way, no password or credentials are ever exchanged or transmitted in clear between the client device and the server.

While the above login/authentication process and the decryption key uses a single user provided keyword, one alternative would be for the user to use different keywords for the login/authentication process and for the decryption key. In yet another alternative, a single master password is derived from all of the user credentials entered, including the user provided keyword. A hash of this single master password is created and half of the resulting hash may be used as the login/authentication password while the other half of the resulting hash may be used as the decryption key.

As an alternative to using the result from a one-way hash for the login/authentication password and decryption key, the string from the credentials could, instead of being processed through hashing, be encrypted. To make this more difficult to reverse or decrypt, and to ensure that the process is a one-way process, the same string could be used as the key for encrypting the string. The result from encrypting the string can then be used as the login/authentication password or decryption key. As an alternative, after the encryption, half of the resulting string could be used as the login/authentication password while the other half is used as the decryption key.

One advantage of the various aspects of the present invention is that it allows a user to be able to access his or her data from any client device that is compliant to the present invention. That is, E2EE can be had by any client device that is logged in and authenticated to the server. The client device can then download the encrypted private key and, using the user entered credentials, can decrypt the encrypted private key. The decrypted private key can then be used to decrypt the encrypted data received from the server.

In one implementation, further security may be had by placing the encrypted data in an RSA/AES envelope. For non-reversible or one-way hash functions which may be used with the various aspects and implementations of the present invention, SHA512 may be used.

Figure 4:
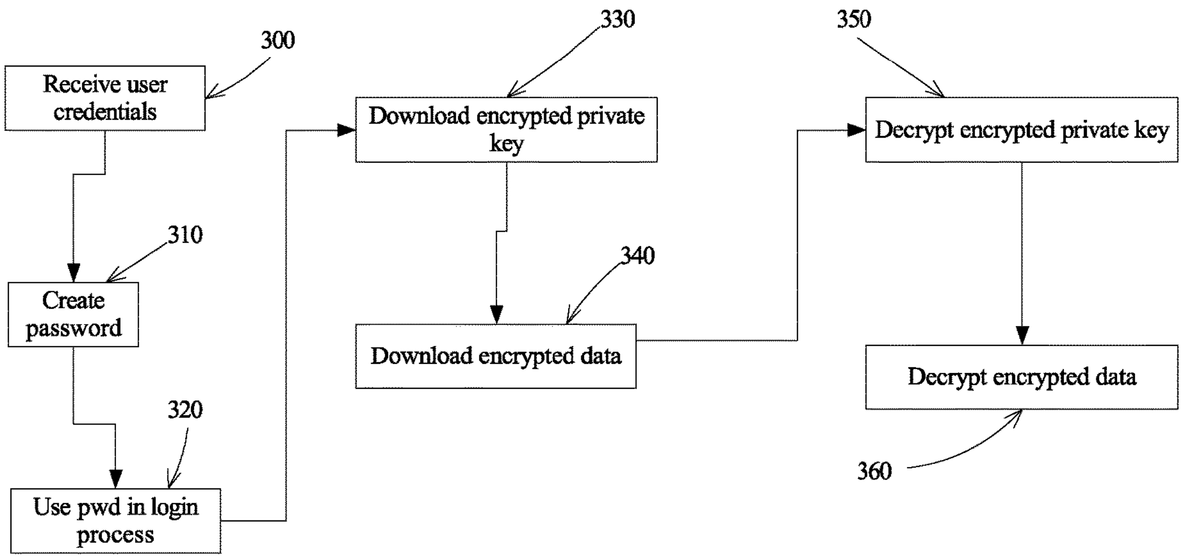
FIG. 4 is a flowchart detailing the steps in another aspect of the present invention.

Referring to FIG. 4, a flowchart detailing the steps in a method according to another aspect of the present invention is illustrated. The method starts at step 300, that of receiving user credential input at the client device from the user. The credential input may include the user's username, email, telephone number, and at least one keyword. The next step is that of creating a login/authentication password from the user entered credentials (step 310). The login/authentication password is then used in a login/authentication process (step 320) that logins in and authenticates the user and the client device to the server. Once the login and authentication process is complete, step 330 is that of downloading the encrypted private key from the server to the client device. Step 340 then downloads the encrypted data from the server. This encrypted data may be data stored in the server by the user or it may be incoming data from another user. This encrypted data can only be decrypted using the decrypted version of the encrypted private key. Step 350 is that of decrypting the encrypted private key using a decryption key derived from the user entered credentials. As noted above, the generation of the decryption key may involve generating a one way hash and/or concatenating various parts of the different user credentials entered. Once the private key has been decrypted using the decryption key, the encrypted data is then decrypted using the decrypted private key (step 360).

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for accessing encrypted data using a client device, said encrypted data being transmitted from a server to said client device, the method comprising:

undergoing a login and authentication process to thereby authenticate a user and said client device to said server, said login and authentication process involving an authentication password, wherein said authentication password is derived from user supplied credentials and a first user supplied keyword;

receiving an encrypted private key from said server at said device;

decrypting said encrypted private key at said client device using a private key decryption key, said private key decryption key being derived from a second user supplied keyword along with said user supplied credentials;

receiving said encrypted data from said server;

decrypting said encrypted data using said decrypted private key;

wherein said user first password and said user second password are only available to said user;

the login and authentication process and the private key decryption key use different keywords;

said encrypted private key is undecryptable by said server;

said encrypted private key can only be decrypted using said private key decryption key;

said decrypted private key is only ever used by said client device.

2. The method according to claim 1, wherein said encrypted data is encrypted by a public key that corresponds to said private key.

3. The method according to claim 1, wherein said login and authentication process comprises:

receiving said user supplied credentials from said user, said user credentials including said first user supplied keyword;

creating said authentication password based on said user supplied credentials;

transmitting a version of said authentication password to said server to thereby get said client and said user authenticated by said server.

4. The method according to claim 3, wherein said authentication password is formulated from a combination of at least two of said user supplied credentials, said user supplied credentials including at least one of:

a username;

an email address;

a telephone number; and a user supplied password.

5. The method according to claim 1, wherein derivation of said authentication password and said private key decryption key involves a non-reversible hashing process.

6. The method according to claim 1, wherein derivation of said authentication password and said private key decryption key involves a one-way encryption process.

7. The method according to claim 1, wherein derivation of said private key decryption key involves a passphrase specific to an implementation of said method.

8. The method according to claim 3, wherein creation of said authentication password involves a passphrase specific to an implementation of said method.

9. The method according to claim 1, wherein said first user supplied keyword and said second user supplied keyword are each generated by said user.

* * * * *